United States Patent
Patil et al.

(10) Patent No.: US 10,548,177 B2
(45) Date of Patent: Jan. 28, 2020

(54) BEARER ACTIVATION FOR MULTIPLE RADIO ACCESS TECHNOLOGY DUAL CONNECTIVITY SCENARIOS

(71) Applicant: Verizon Patent and Licensing Inc., Arlington, VA (US)

(72) Inventors: Sudhakar Reddy Patil, Flower Mound, TX (US); Vishwanath Ramamurthi, San Ramon, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 112 days.

(21) Appl. No.: 15/955,111

(22) Filed: Apr. 17, 2018

(65) Prior Publication Data

US 2019/0320480 A1 Oct. 17, 2019

(51) Int. Cl.
| | | |
|---|---|---|
| H04W 24/04 | (2009.01) | |
| H04W 36/28 | (2009.01) | |
| H04W 48/18 | (2009.01) | |
| H04W 88/08 | (2009.01) | |
| H04W 92/02 | (2009.01) | |
| H04W 76/16 | (2018.01) | |
| H04W 24/10 | (2009.01) | |

(52) U.S. Cl.
CPC .......... *H04W 76/16* (2018.02); *H04W 24/10* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2015/0109927 A1* | 4/2015 | Ozturk | .............. | H04W 36/0027 370/235 |
| 2015/0365878 A1* | 12/2015 | Cho | ...................... | H04W 40/12 370/254 |
| 2016/0014686 A1* | 1/2016 | Cho | ...................... | H04W 48/18 370/328 |
| 2016/0142954 A1* | 5/2016 | Cho | ...................... | H04W 36/36 370/331 |
| 2016/0219440 A1* | 7/2016 | Wang | ..................... | H04W 24/02 |
| 2016/0365912 A1* | 12/2016 | Yang | ..................... | H04B 7/0626 |
| 2017/0171771 A1* | 6/2017 | Jung | ..................... | H04W 24/10 |
| 2017/0353865 A1* | 12/2017 | Li | ...................... | H04L 27/2613 |
| 2018/0084539 A1* | 3/2018 | Kubota | .............. | H04W 72/048 |
| 2018/0124642 A1* | 5/2018 | Phuyal | ................. | H04W 28/08 |

(Continued)

*Primary Examiner* — Duc T Duong

(57) ABSTRACT

A method for activating bearers in radio access networks includes receiving information regarding channel conditions for a secondary RAT; identifying a first set of radio bearers for a primary RAT and a second set of radio bearers for the secondary RAT based on the received channel conditions; and establishing the first set of radio bearers associated with the primary RAT. The method may also include providing a message to a core network indicating that first set of radio bearers have been established for the primary RAT, the message includes an indication that the second set of radio bearers will be established after the core network has been configured for operation with the first set of radio bearers; reconfiguring a UE for establishing the second set of radio bearers associated with the secondary RAT; and indicating that the reconfiguration of the UE for the second set of radio bearers is complete.

20 Claims, 10 Drawing Sheets

(56) References Cited

U.S. PATENT DOCUMENTS

2019/0191351 A1* 6/2019 Chong ................. H04W 72/12
2019/0223075 A1* 7/2019 Jin ......................... H04W 8/24
2019/0245738 A1* 8/2019 Wu ........................ H04L 41/08

* cited by examiner

800

```
┌─────────────────────────────────────┐
│ RECEIVE MEASUREMENT REPORTS FROM    │
│ UE REGARDING CHANNEL CONDITIONS OF  │─ 805
│ RADIO BEARERS FOR SECONDARY RAT     │
└─────────────────────────────────────┘
                  ↓
┌─────────────────────────────────────┐
│ IDENTIFY A FIRST SET OF RADIO BEARERS│
│ SUITABLE FOR PRIMARY RAT AND A      │─ 810
│ SECOND SET OF RADIO BEARERS FOR     │
│ SECONDARY RAT                        │
└─────────────────────────────────────┘
                  ↓
┌─────────────────────────────────────┐
│ ESTABLISH A FIRST SET OF BEARERS    │─ 815
│ ASSOCIATED WITH PRIMARY RAT         │
└─────────────────────────────────────┘
                  ↓
┌─────────────────────────────────────┐
│ PROVIDE AN INDICATION TO THE CORE   │
│ NETWORK THAT THE FIRST SET OF       │
│ BEARERS HAVE BEEN ESTABLISHED AND   │
│ THE SECOND SET OF BEARERS WILL BE   │─ 820
│ SUBSEQUENTLY ESTABLISHED AFTER      │
│ NETWORK CORE HAS BEEN CONFIGURED    │
│ FOR OPERATION WITH THE FIRST SET OF │
│ RADIO BEARERS                       │
└─────────────────────────────────────┘
                  ↓
┌─────────────────────────────────────┐
│ RECONFIGURE THE UE FOR              │
│ ESTABLISHING THE SECOND SET OF      │─ 825
│ RADIO BEARERS ASSOCIATED WITH THE   │
│ SECONDARY RAT                       │
└─────────────────────────────────────┘
                  ↓
┌─────────────────────────────────────┐
│ INDICATE TO THE SECONDARY NODE      │
│ THAT RECONFIGURATION OF THE UE FOR  │─ 830
│ USING SECOND SET OF BEARERS IS      │
│ COMPLETE                            │
└─────────────────────────────────────┘
```

FIG. 8

BEARER ACTIVATION FOR MULTIPLE RADIO ACCESS TECHNOLOGY DUAL CONNECTIVITY SCENARIOS

BACKGROUND

Long Term Evolution (LTE) is an existing mobile telecommunications standard for wireless communication. LTE networks include $4^{th}$ Generation (4G) wireless networks which are widely deployed throughout the world. LTE increased the capacity and speed from prior generations of wireless networks and simplified the network architecture to a packet-based system. Next Generation wireless networks, such as $5^{th}$ Generation (5G) networks, have been proposed as the next evolution of wireless networks. Next Generation wireless networks are designed to increase data transfer rates, increase spectral efficiency, improve coverage, improve capacity, and reduce latency.

BRIEF DESCRIPTION OF THE DRAWINGS

FIG. 8 is a flow chart showing an exemplary process for bearer activation which may be performed by a master node.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to wireless communications systems which may efficiently activate bearers within multiple radio access technologies (multi-RATs) employing dual connectivity configurations. Dual connectivity configurations have been established to accomplish higher per-user throughput and mobility robustness, and improve load balancing. In a multi-RAT dual connectivity deployment, a user equipment (UE) device may be wirelessly connected simultaneously to two nodes: a master node, which is associated with a primary RAT, and a secondary node which is associated with the secondary RAT.

In conventional dual connectivity configurations having multi-RAT deployments, all of the radio bearers are first set up for wireless communication with the master node. Once the radio bearers for the master node have been established, suitable radio bearers are then transferred and reestablished for use with the secondary node. As used herein, the term "establish" is not restricted to initiating the radio bearers or setting up the radio bearers for the first time, but may also apply to reestablishing or activating the radio bearers upon UE transitioning from an idle state to an active state (e.g., waking up from a power saving mode). Thus, in conventional systems, some inefficiency occurs as the transferred bearers are initially setup at the master node only to be subsequently transferred for use with the secondary node. This inefficiency may be compounded as the UE cycles between idle and active states (which may occur every 10 seconds), because the radio bearers are released by the nodes to conserve resources, only to be reestablished when the UE becomes active again after a period of inactivity. Thus, the transferred radio bearers, which are not used by the master node for wireless communications with the UE, are repeatedly set up and torn down as the UE cycles causing unnecessary messaging activity in the core network.

Embodiments herein avoid this inefficiency by initially having the master node only establish radio bearers which will be used by the primary RAT for wireless communication with the UE. Once the radio bearers for use by the master node are established, radio bearers which are suitable for use with the secondary RAT are established for use with the secondary node for wireless communications with the UE. This approach to bearer activation may avoid the inefficiencies of conventional networks which needlessly set up radio bearers at the master node which are never used for wireless communications with the UE over the primary RAT.

Figure 1:
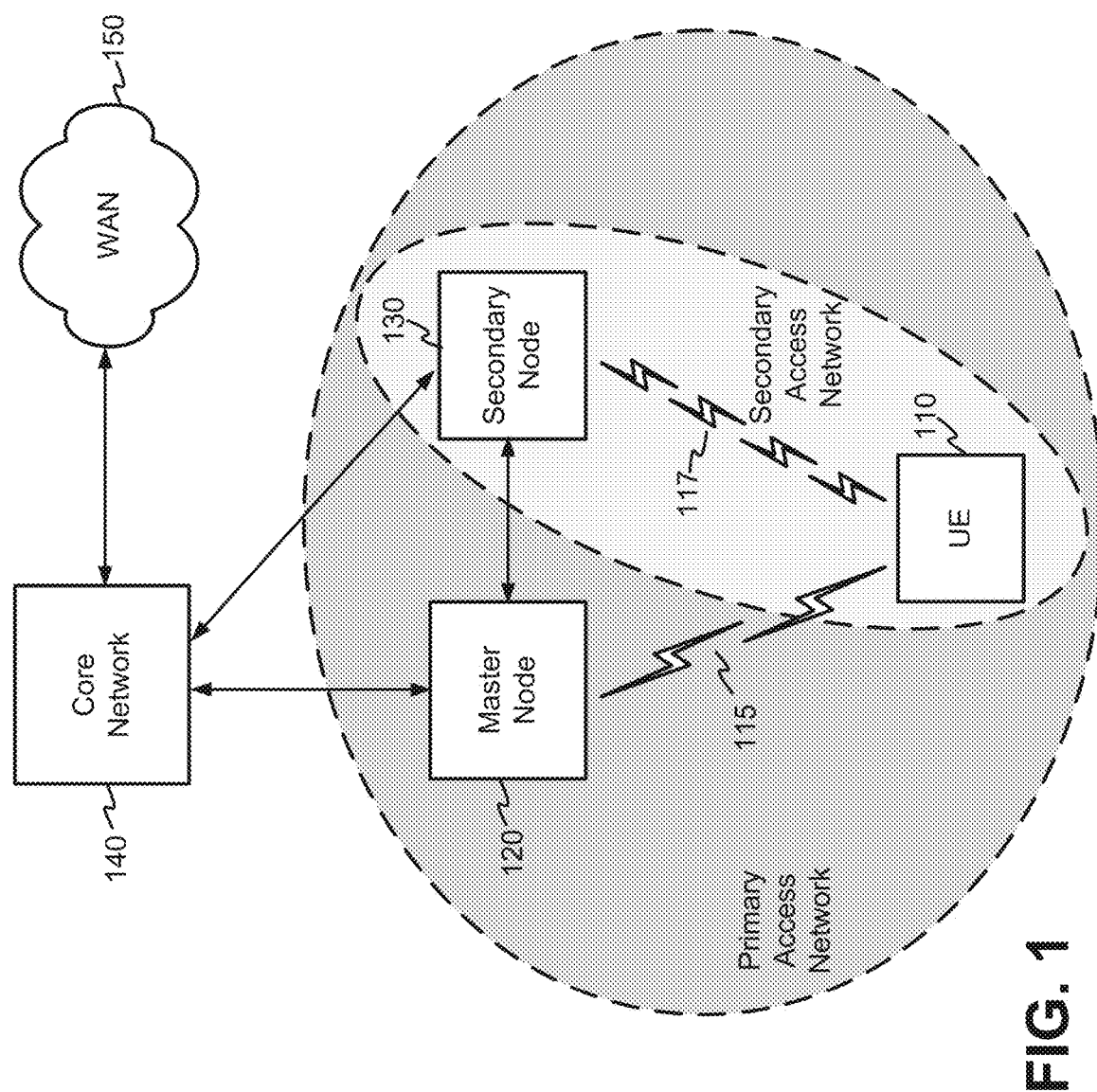
FIG. 1 is a diagram illustrating an exemplary network environment providing multiple radio access technologies (RATs) for dual wireless connectivity.

FIG. 1 is a diagram illustrating an exemplary network environment 100 providing multiple radio access technologies (RATs) for dual wireless connectivity. Network environment 100 may include a user equipment (UE) device 110, a master node (MN) 120, a secondary node (SN) 130, a core network 140, and a wide area network (WAN) 150. Network environment 100 may be divided into a primary access network and a secondary access network. The primary access network includes both wireless access nodes, MN 120 and SN 130, and UE 110. The secondary access network includes secondary node 130 and UE 110, and may be thought of as a subset of the primary access network. For ease of explanation, only one UE 110, one MN 120, and one SN 130 are illustrated as being connected to core network 140. However, any number of UEs 110, MNs 120, SNs 130, core networks 140 and/or other known network entities may be included in network environment 100.

As shown in FIG. 1, UE 110 may connect to core network 140, and in turn with WAN 150, through separate wireless access nodes using wireless channels having two different RATs. Specifically, UE 110 may wirelessly communicate through MN 120 over primary RAT 115, and wirelessly communicate though SN 130 over secondary RAT 117. UE 110 may communicate over each RAT 115, 117 separately or use both RATs 115, 117 simultaneously. To provide flexibility and improved performance, primary RAT 115 and secondary RAT 117 may be based on different wireless standards. For example, in one embodiment, core network 140 and MN 120 may operate in accordance with the LTE wireless standard (e.g., 4G and 4.5G), and SN 130 operates in accordance with the 5G wireless standard. Alternatively, in another embodiment, MN 120 may operate in accordance with the 5G wireless standard, and SN 130 may operate in accordance with the LTE (e.g., 4G and 4.5G) wireless standard. Other embodiments may operate in accordance with other technologies for public land mobile networks (PLMNs) and include other cellular network standards, and/or any other local and/or wide area wireless networking technologies.

MN 120 may control standard procedures for having the UE 110 initiate connections and interact with core network 140. For example, UE 110 may initiate procedures such as, for example, Attach, Tracking Area Update, Service Request, etc., thorough MN 120 to transition into a connected state with core network 140. During such procedures, radio bearers may be established for communicating over an air channel interface using a particular RAT 115, 117. As used herein, the term "bearer" may refer to a virtual network connection between two endpoints which provides a transport service for exchanging data having specified quality of service (QoS) attributes. The data exchanged over bearers, also referred to herein as "service data flows," may be associated with a particular service class (e.g., conversational class for voice data, streaming class for video data, interactive class for web browsing, etc.).

The MN 120 may determine which RAT 115, 117 is best suited for a particular bearer depending upon, for example, the QoS of the bearer. The determination may be made, for example, based on measurement reports of channel conditions for each RAT 115, 117. MN 120 may initially only establish a first set of radio bearers associated with primary RAT 115 for communications with core network 140. After the first set of radio bearers are established, a second set of radio bearers associated with RAT 117 may be established between UE 110 and SN 130. Once radio bearers have been set up on RATs 115 and 117, UE 110 may wirelessly communicate over either RAT 115 or 117, or both RATs 115 and 117 simultaneously, to exchange service data flows with core network 140 and WAN 150.

MN 120 and SN 130 may each be directly connected to core network 140 to exchange service data flows within the network environment 100 and communicate with external resources (not shown) connected to WAN 150. MN 120 and SN 130 may also be connected directly to each other to provide a redundant path for service data flows in the event one of the wireless channels corresponding to RAT 115 or RAT 117 experiences a failure.

While the embodiment shown in FIG. 1 only shows two different RATs 115 and 117 in a dual connectivity scenario, additional RATs (i.e., three or more), which could be based on standards other than LTE and/or 5G (e.g., cellular and/or other wireless technologies such as WiFi), may be used to provide alternate approaches for wireless connectivity.

UE 110 may include any type of UE having multiple RAT capabilities, and thus communicate with multiple nodes using different wireless channels employing different types of RATs 115, 117. UE 110 may be a UE that may include, for example, a cellular radiotelephone, a smart phone, a tablet, a set-top box (STB), a mobile phone, any type of internet protocol (IP) communications device, a Voice over Internet Protocol (VoIP) device, a laptop computer, a palmtop computer, a wearable computer, a gaming device, a media player device, or a digital camera that includes communication capabilities (e.g., wireless communication mechanisms such as Wi-Fi), an Internet of Things (IoT) device, etc. In various embodiments, the RAT 115 and/or RAT 117 may be supported by any appropriate cellular radio access network (RAN), such as, for example, an LTE evolved universal terrestrial radio access network (eU-TRAN) and a 5G network. In other embodiments, the RATs 115 and/or 117 may include a local or wide area wireless network. A local area wireless network may include any type of WiFi (e.g., any IEEE 802.11x network, where x=a, b, c, g, and/or n). A wide area wireless network may include any type of wireless network covering larger areas, and may include a mesh network (e.g., IEEE 802.11s) and/or or a WiMAX IEEE 802.16.

MN 120 may be configured to operate in multiple coverage modes and/or using one or more wireless channels based on different RATs in accordance with one or more known wireless standards. MN 120 may be reconfigurable with respect to improvements of existing standards and future standards for any type of radio access network, and can be compatible with known wireless standards. Such standards may include, for example, LTE, LTE Advanced, 5G, etc. In some embodiments, MN 120 may be a wireless access point which can service any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. MN 120 may also have a direct connection with SN 130 to provide a failover in the event a wireless channel associated with RAT 115 or 117 becomes inoperable.

SN 120 may be configured to operate in multiple coverage modes and/or using one or more wireless channels based on different RATs in accordance with one or more known wireless standards. Secondary node 120 may typically operate using a different type of RAT 117 than RAT 115 used by MN 120. SN 130 may be reconfigurable with respect to improvements of existing standards and future standards for any type of radio access network, and can be compatible with known wireless standards. Such standards may include, for example, LTE, LTE Advanced, 5G, etc. In some embodiments, SN 130 may be a wireless access point which can service any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. SN 130 may also have a direct connection with MN 120 to provide a failover in the event a wireless channel associated with RAT 115 or 117 becomes inoperable.

Core network 140 may be a core networking infrastructure that provides mobility management, session management, authentication, and packet transport to support UE 110, MN 120, and SN 130 wireless communication using a dual connectivity, multi-RAT configuration. Core network 140 may further provide access to WAN 150. Core network 140 may be compatible with known wireless standards which may include, for example, LTE, LTE Advanced, 3GPP 5G, Global System for Mobile Communications (GSM), Universal Mobile Telecommunications System (UMTS), IS-2000, etc.

WAN 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Figure 2:
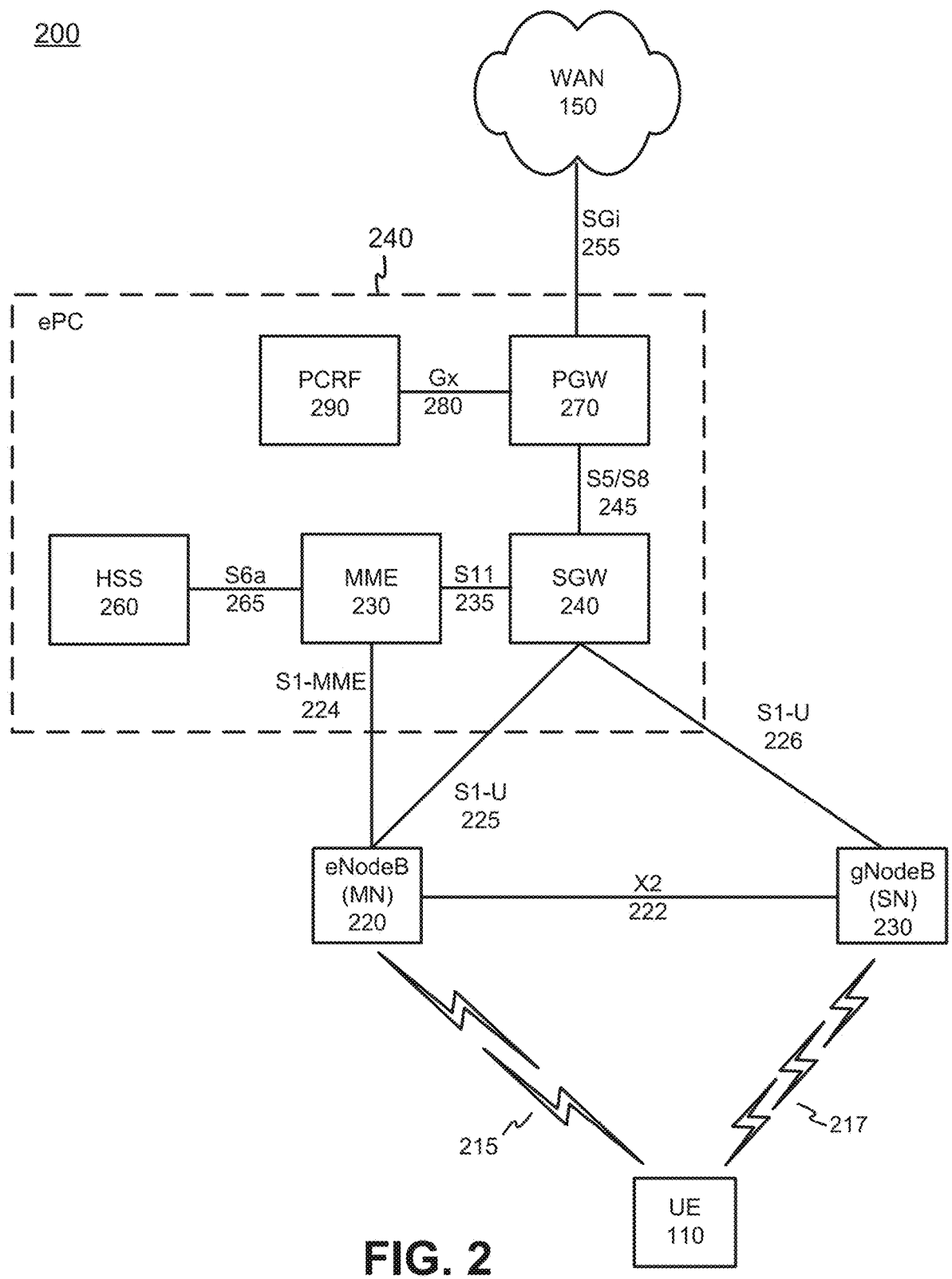
FIG. 2 is a block diagram of an exemplary networking system having a primary access network based on an LTE standard and a secondary access network based on a 5G standard.

FIG. 2 is a block diagram of an exemplary networking system 200 having the primary access network based on the LTE standard and the secondary access network based on the 5G standard. Networking system 200 may include an LTE network which is part of a multi-RAT radio access network having eNodeB 220 serving as a master node (MN). The secondary access network may include a gNodeB 230 serving as a secondary node (SN). UE 110 and eNodeB 220 may exchange data over a wireless channel that is a primary RAT 215 based on LTE air channel interface protocols, while UE 110 and gNodeB 230 may exchange data over a wireless channel that is a secondary RAT 217 based on 5G air channel interface protocols. UE 110 may be configured to operate with both RATs 215, 217, and can communication data simultaneously over each respective RAT.

In the embodiment shown in FIG. 2, core network 140 may be realized as an evolved Packet Core (ePC) 240 which works in conjunction with an evolved Universal Mobile Telecommunications System (UMTS) Terrestrial Network (eUTRAN) that includes at least one eNodeB 220. Networking system 200 may further include an Internet Protocol (IP) network, which may be embodied separately or included in a backhaul network (not shown) and/or WAN 150.

EPC 240 may include one or more devices that are physical and/or logical entities interconnected via standardized interfaces. EPC 240 provides wireless packet-switched services and wireless IP connectivity to user devices to provide, for example, data, voice, and/or multimedia services. EPC 240 may further include a mobility management entity (MME) 230, a serving gateway (SGW) 240, a home subscriber server (HSS) 260, a packet data network gateway (PGW) 270, and a Policy and Charging Rules Function (PCRF) 290. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 and gNodeB 230 may include one or more devices and other components having functionality that allows UE 110 to wirelessly connect the respective RAT 215, 217 of eNodeB 220 and gNodeB 230, respectively. ENodeB 220 may interface with ePC 240 via a S1 interface, which may be split into a control plane S1-MME interface 224 and a data plane S1-U interface 225. EnodeB 220 may interface with MME 230 via S1-MME interface 224, and interface with SGW 240 via S1-U interface 225. GNodeB 230 may interface with ePC 240 via a data plane S1-U interface 226. S1-U interface 226 may be implemented, for example, using GTP. S1-MME interface 225 may be implemented, for example, with a protocol stack that includes a Non-Access Stratum (NAS) protocol and/or Stream Control Transmission Protocol (SCTP).

ENodeB 220 and gNodeB 230 may communicate directly over an X2 interface 222 that may serve, for example, as a failover data connection in the event one of the wireless channels associated with RATs 215, 217 fails. The X2 interface 222 may use a protocol that tunnels end-user packets between eNodeB 220 and gNodeB 230, where the tunneling function supports the identification of packets with the tunnels and packet loss management. X2 interface 222 may use GTP-U over user datagram protocol (UDP) or internet protocol (IP) as the transport layer protocol.

MME 230 may implement control plane processing for both the primary access network using and the secondary access network. For example, through either eNodeB 220 or gNodeB 230, MME 230 may implement tracking and paging procedures for UE 110, may activate and deactivate bearers for UE 110, and may authenticate a user of UE 110 to provide normal coverage service for operating in normal UE device mode. MME 230 may also select a particular SGW 240 for a particular UE 110. MME 230 may interface with other MMEs (not shown) in ePC 240 and may send and receive information associated with UEs 110, which may allow one MME 230 to take over control plane processing of UEs serviced by another MME 230, if the other MME becomes unavailable.

SGW 240 may provide an access point to and from UE 110, may handle forwarding of data packets for UE 110, and may act as a local anchor point during handover procedures between eNodeBs 220 and gNodeB 230. SGW 240 may interface with PGW 270 through an S5/S8 interface 245. S5/S8 interface 245 may be implemented, for example, using GTP.

PGW 270 may function as a gateway to WAN 150 through a SGi interface 255. WAN 150, which may provide various services (e.g., over the top voice services) to UE 110. A particular UE 110, while connected to a single SGW 240, may be connected to multiple PGWs 250, one for each packet network with which UE 110 communicates.

Alternatively, UE 110 may exchange data with WAN 150 though a WiFi wireless access point (WAP) (not shown). The WiFi WAP may be part of a local area network, and access WAN 150 through a wired connection via a router. Alternatively, the WiFi WAP may be part of a mesh network (e.g., 802.11s). The WiFi WAP may also be part of a wide area network (WiMAX) or a mesh network (802.11s).

MME 230 may communicate with SGW 240 through an S11 interface 235. S11 interface 235 may be implemented, for example, using GTPv2. S11 interface 235 may be used to create and manage a new session for a particular UE 110. S11 interface 235 may be activated when MME 230 needs to communicate with SGW 240, such as when the particular UE 110 attaches to ePC 240, when bearers need to be added or modified for an existing session for the particular UE 110, when a connection to a new PGW 270 needs to be created, or during a handover procedure (e.g., when the particular UE 110 needs to switch to a different SGW 240).

HSS 260 may store information associated with UEs 110 and/or information associated with users of UEs 110. For example, HSS 260 may store user profiles that include registration, authentication, and access authorization information. MME 230 may communicate with HSS 260 through an S6a interface 265. S6a interface 265 may be implemented, for example, using a Diameter protocol.

PCRF 290 provides policy control decision and flow based charging control functionalities. PCRF 290 may provide network control regarding service data flow detection, gating, QoS and flow based charging, etc. PCRF 290 may determine how a certain service data flow shall be treated, and may ensure that user plane traffic mapping and treatment is in accordance with a user's subscription profile. PCRF 290 may communicate with PGW 270 using a Gx interface 280. Gx interface 280 may be implemented, for example, using a Diameter protocol.

During various procedures consistent with the operation of an LTE network, such as, for example, an Attach procedure, a Tracking Area Update, a Service Request etc., UE 110 may employ normal procedures and utilize eNodeB 220 to move into a connected state with the LTE network. For this state, eNodeB 220 may establish radio bearers that are requested by ePC 240. Typically, within ePC 240, Internet and internet multimedia system (IMS) access point name (APN) related bearers are established, so eNodeB 220 may establish radio bearers to exchange service data flows with UE 110. In the embodiment shown in FIG. 2, eNodeB 220 may initially establish radio bearers which will be used only by primary RAT 215 for wireless communication with UE 110. Once the radio bearers for use by the eNodeB 220 are established, then eNodeB 220 may configure UE 110 for operation with radio bearers with gNodeB 230 on secondary RAT 217. Details of the messages exchanged for setting up radio bearers on RAT 215 and 217 during a service request are described below in relation to FIGS. 6A-7B.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
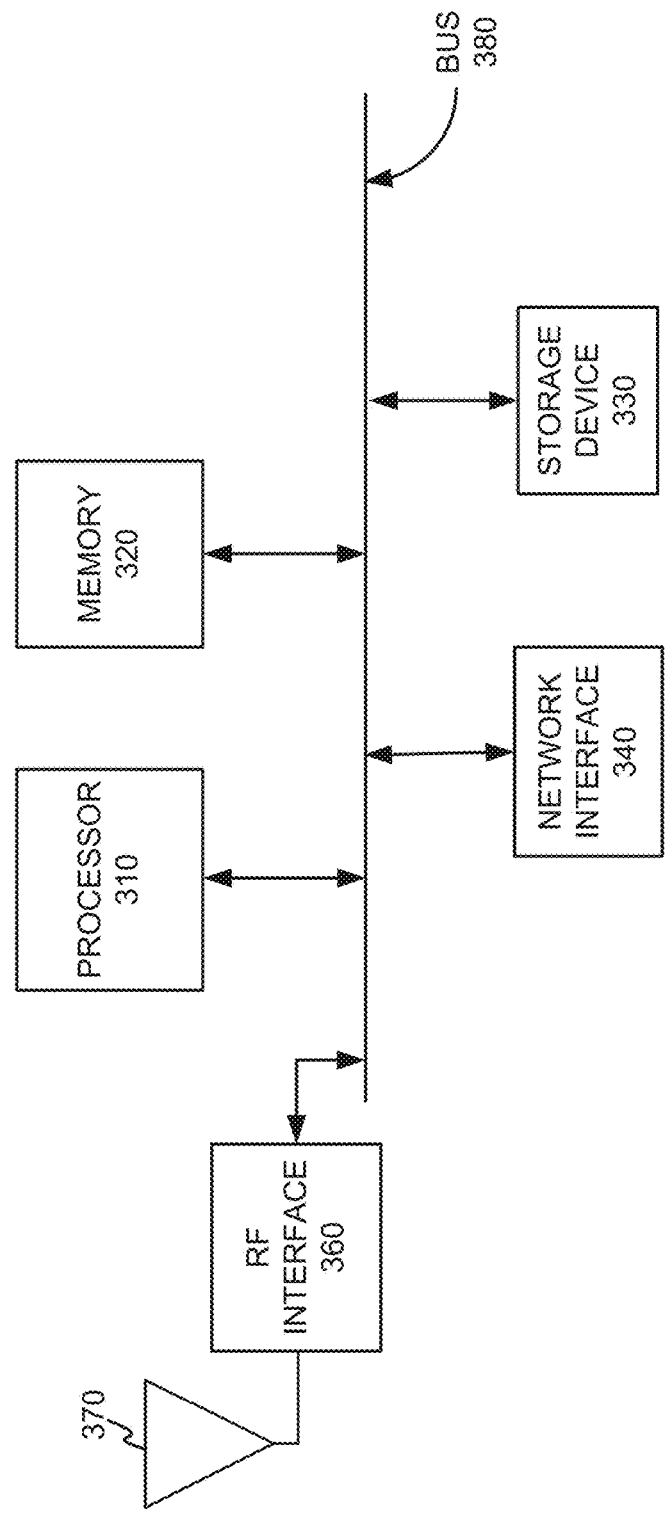
FIG. 3 is a block diagram showing exemplary components of an eNodeB according to an embodiment.

FIG. 3 is a block diagram showing exemplary components of an eNodeB 220 according to an embodiment. ENodeB 220 may provide connectivity to UE 110 over an air channel interface using RAT 215 based on wireless protocols in accordance with LTE, LTE Advance, 3GPP 4G and/or 4.5G. ENodeB 220 may provide wireless network connectivity to devices connected to evolved Packet Core (ePC) 240 in a dual connectivity, multi-RAT configuration, and to network devices connected to wide area networks (e.g., the Internet). As shown in FIG. 3, eNodeB 220 may include a processor 310, a memory 320, a storage device 330, a network interface 340, a radio frequency (RF) interface 360, and an antenna 370. A bus 380 may interconnect the components of eNodeB 220 to exchange data and/or analog signals.

Processor 310 may include one or more processors, microprocessors, application specific integrated circuits (ASICs), field programmable gate arrays (FPGAs), and/or other processing logic. Processor 310 may control operation of eNodeB 220 and its components and perform signal processing operations, for example, the digital modulation and demodulation of signals. Processor 310 may also perform processing to facilitate communications over the backhaul network and WAN 150. Processor 310 may also operate in the non-access stratum and thus facilitate signaling and coordination with network devices in wireless access network to manage the establishment of communication sessions and for maintaining continuous communications. Processor 310 may include a modem (not shown) and function together to facilitate the operations of eNodeB 220 in accordance with a variety of wireless communication protocols.

Memory 320 may include a random access memory (RAM) or another type of dynamic storage device, a read only memory (ROM) or another type of static storage device, a removable memory card, and/or another type of memory to store data and instructions that may be used by processor 310. Storage device 330 may include any type of mass storage device such as a hard disk, a solid state disk, etc., for long term and/or scratch storage of data and instructions used by processor 310.

Network interface 340 may include a logical component that includes input and/or output ports, input and/or output systems, and/or other input and output components that facilitate the transmission of data to other devices via a backhaul link. For example, network interface 340 may include a network interface card (e.g., Ethernet card) for wired communications and/or a wireless network interface (e.g., a WiFi) card for wireless communications.

RF interface 360 may include one or more RF transceivers that enable eNodeB 220 to communicate with UEs 110 via wireless communications using RAT 115. An RF transceiver may include an RF transmitter that receives signals to be transmitted wirelessly and performs signal processing on the signals before providing the signals to antenna 370, and an RF receiver that receives signals from antenna 370 and performs RF signal processing on the received signals before providing the received signals to processor 310. For example, the RF transceiver may perform analog-to-digital and digital-to-analog conversion, analog and/or digital modulation and demodulation, up-conversion and down-conversion, and/or amplification of signals.

Antenna 370 may include one or more antennas to transmit and/or receive RF signals over the air. Antenna assembly 370 may, for example, receive RF signals from network interface 340 and transmit the signals over the air, and receive RF signals over the air and provide them to network interface 340.

As described herein, eNodeB 220 may perform certain operations in response to processor 310 executing software instructions contained in a computer-readable medium, such as memory 320 and/or storage device 330. A computer-readable medium may be defined as a non-transitory memory device. A non-transitory memory device may include memory space within a single physical memory device or spread across multiple physical memory devices. The software instructions may be read into memory 320 from another computer-readable medium or from another device via network interface 340. The software instructions contained in memory 320 may cause processing unit 310 to perform processes that will be described below in relation to FIG. 8. Alternatively, hardwired circuitry may be used in place of, or in combination with, software instructions to implement processes described herein. Thus, implementations described herein are not limited to any specific combination of hardware circuitry and software.

Although FIG. 3 shows example components of eNodeB 220, in other implementations, eNodeB 220 may include fewer components, different components, differently arranged components, or additional components than those depicted in FIG. 3. Additionally or alternatively, one or more components of eNodeB 220 may perform the tasks described as being performed by one or more other components of eNodeB 220.

Figure 4:
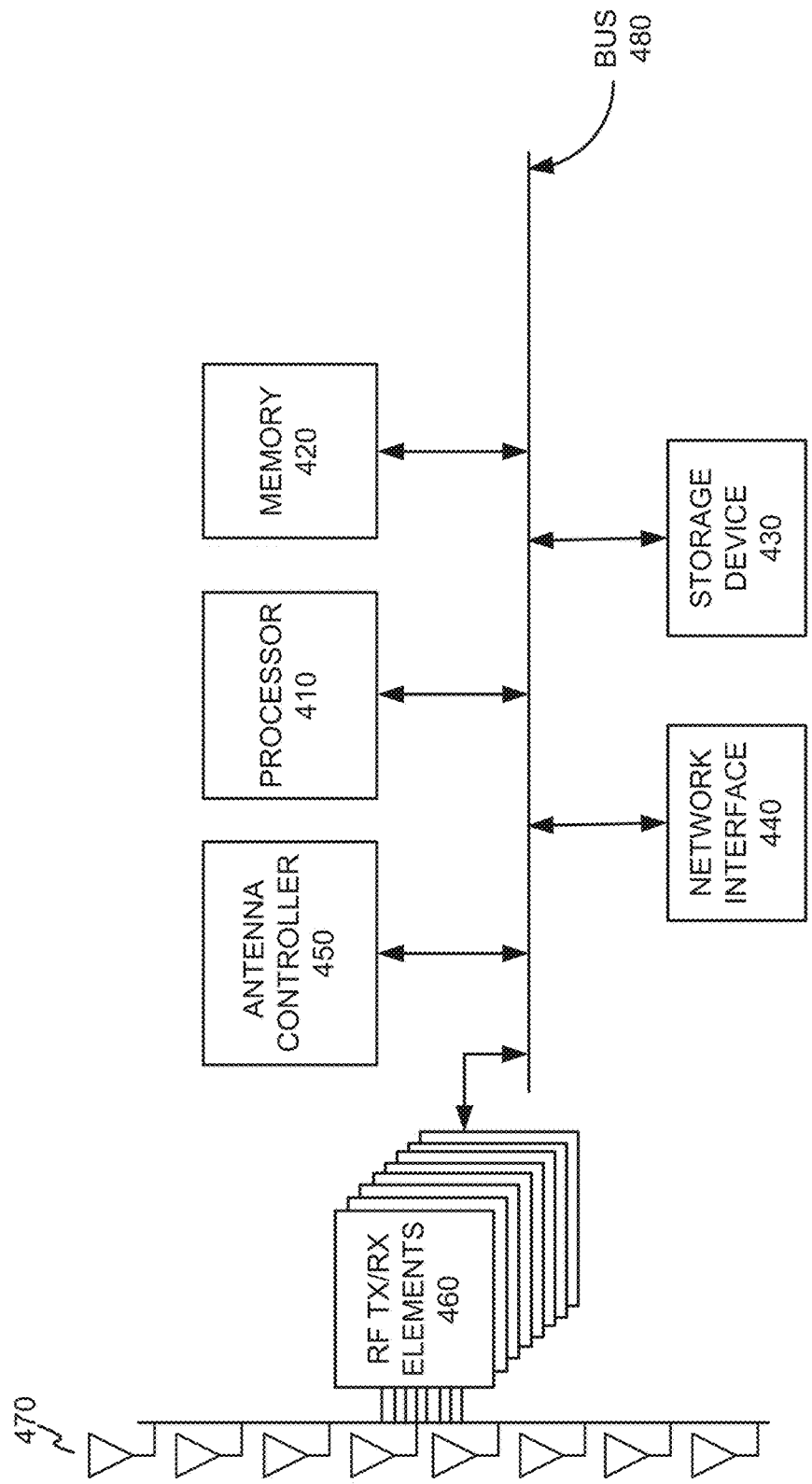
FIG. 4 is a is a block diagram showing exemplary components of an gNodeB according to an embodiment.

FIG. 4 is a block diagram showing exemplary components of a gNodeB 230 according to an embodiment. GNodeB 230 may provide connectivity to UE 110 over an air channel interface using RAT 217 based on wireless protocols in accordance with 3GPP 5G. GNodeB 230 may further provide wireless and/or wireless network connectivity to other devices connected to ePC 240 in a dual connectivity, multi-RAT configuration, and to network devices connected to wide area networks (e.g., the Internet). GNodeB 230 may include a processor 410, a memory 420, a storage device 430, a network interface 440, an antenna controller 450, RF transmit/receive (TX/RX) elements 460, and an antenna array 470. A bus 480 may interconnect the components of gNodeB 230 to exchange data and/or analog signals.

Processor 410 may include one or more processors, microprocessors, application specific integrated circuits (ASICs), field programmable gate arrays (FPGAs), and/or other processing logic that may interpret and execute instructions and/or low level logic. Processor 410 may control operation of gNodeB 230 and its components. Processor 410 may also perform various communications and signal processing operations allowing for gNodeB 230 to efficiently communicate over the wireless network. Processor 410 may also perform processing to facilitate communications over the back haul network and WAN 150. Processor 410 may also operate in the non-access stratum and thus facilitate signaling and coordination with network devices in wireless access network to manage the establishment of communication sessions and for maintaining continuous communications. Processor 410 may include a modem (not shown) and function together to facilitate the operations of gNodeB 230 in accordance with a variety of wireless communication protocols.

Memory 420 may include a random access memory (RAM) or another type of dynamic storage device to store data and instructions that may be used by processor 410. Storage device 430 may include a persistent solid state read/write device, a magnetic, and/or optical recording medium and its corresponding drive.

Network interface 440 may include a logical component that includes input and/or output ports, input and/or output systems, and/or other input and output components that facilitate the transmission of data to other devices via a backhaul link. For example, network interface 440 may include a network interface card (e.g., Ethernet card) for wired communications and/or a wireless network interface (e.g., a WiFi) card for wireless communications.

Antenna controller 450 may accept data and/or commands (e.g. pointing and/or beamforming commands) from processor 410. Antenna controller 450 may perform TX multiple input multiple output (MIMO) encoding to produce multiple channels of data, for a set of the antenna elements in antenna array 470, which may be transmitted over a downlink channel. Signals which have been received over an uplink channel via antenna array 470 may be decoded using RX MIMO decoding to combine streams into fewer data channels or a single received channel. Antenna controller 450 may further apply beamforming weights (which perform relative phase, frequency, and amplitude modulations between the antenna elements) on the transmit data streams to electronically adjust the transmit antenna pattern. Additionally, antenna controller 450 apply beamforming weights on the receive data streams to electronically adjust the receive antenna pattern.

RF TX/RX elements 460 may include discreet RF elements to amplify, frequency demodulate (e.g., down convert) analog channels received via an uplink channel through antenna array 470, and convert the analog channels to received digital streams using analog to digital converters. The received digital streams may be passed to antenna controller 450 which may further perform RX MIMO processing to combine MIMO streams. RF TX/RX elements 460 may further process transmit digital streams, which may be TX MIMO encoded by antenna controller 450 prior to being converted to analog signals using digital to analog converters. The analog signals may be frequency upconverted and amplified for transmission at RF TX/RX elements 460, and subsequently radiated by antenna array 470, over a downlink channel.

Antenna array 470 may include a number of antenna elements in order to serve multiple sectors and/or to provide various antenna characteristics (e.g., antenna beamwidth, gain, side lobe control, etc.) appropriate for gNodeB 230 operations. The antenna elements may have independent channels that may be used for electronic adjustments of both the transmit and receive antenna patterns, and/or also for transmit and/or receive MIMO processing to improve wireless channel reliability and/or throughput. In an embodiment, antenna elements 470 may be "grouped" (though physical and/or electronic arrangement) and designated for communication with UEs 110 within a particular sector of gNodeB's 230 overall coverage. The sector may be divided into angular segments (measured in a horizontal plane) pointing in different directions in order to distribute coverage for gNodeB 230. For example, antenna elements 470 may be grouped in a triangular arrangement so each side of the triangle serves a 120-degree sector. The antenna pattern, generated by the antenna elements associated with a particular sector, may be characterized by angles (e.g., azimuth and elevation) defined by a sector reference direction for the sector. The sector reference direction may be specified by a vector extending from a reference point associated with the sector.

As described herein, gNodeB 230 may perform certain operations in response to processor 410 executing software instructions contained in a computer-readable medium, such as memory 420 and or storage device 430. A computer-readable medium may be defined as a non-transitory memory device. A non-transitory memory device may include memory space within a single physical memory device or spread across multiple physical memory devices. The software instructions may be read into memory 420 from another computer-readable medium or from another device via network interface 440. The software instructions contained in memory 420 may cause processor 410 to perform processes which include enabling both normal coverage mode and enhanced coverage mode. Alternatively, hardwired circuitry may be used in place of, or in combination with, software instructions to implement processes described herein. Thus, implementations described herein are not limited to any specific combination of hardware circuitry and software.

Although FIG. 4 shows example components of gNodeB 230, in other implementations, gNodeB 230 may include fewer components, different components, differently arranged components, or additional components than those depicted in FIG. 4. Additionally, or alternatively, one or more components of gNodeB 230 may perform the tasks described as being performed by one or more other components of eNodeB 230.

Figure 5:
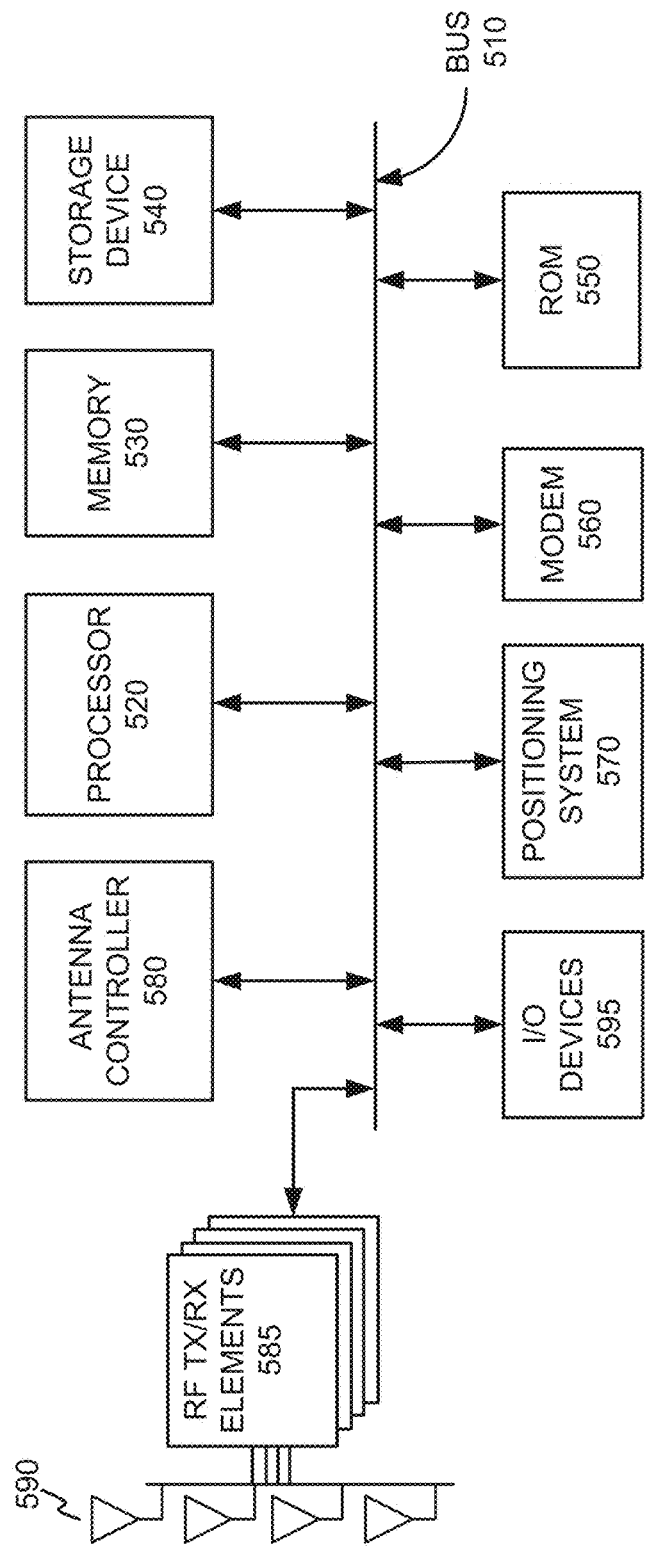
FIG. 5 is a block diagram showing exemplary components of a user equipment (UE) according to an embodiment.

FIG. 5 is a block diagram showing exemplary components of UE 110 according to an embodiment. UE 110 may include any type of electronic UE having communication capabilities, and thus communicate over networks using a variety of different channels, including channels having wired and/or wireless connections. As described previously, UE 110 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms), and Internet of Things (IoT) device, etc. Further referring to FIG. 5, UE 110 may include bus 510, processor 520, memory 530, storage device 540, ROM 550, modem 560, positioning system 570, antenna controller 580, radio frequency transmit/receive (RF TX/RX) elements 585, antenna array 590, and input output (I/O) devices 595. In another embodiment, UE 110 may only have one antenna and a signle associated RF TX/RX module, and may not require antenna controller 580. Bus 510 may interconnect each of the components of UE 110 either directly or indirectly to exchange commands and/or data.

Processor 520 may include a processor, microprocessor, or processing logic that may interpret and execute instructions. Memory 530 may include a random access memory (RAM) or another type of dynamic storage device that may store information and instructions for execution by processor 520. Storage device 540 may include a persistent solid state read/write device, a magnetic, and/or optical recording medium and its corresponding drive. ROM 550 may include a ROM device or another type of static storage device that may store static information and instructions for use by processor 520.

Modem 560 may perform various communications and signal processing operations allowing for UE 110 to efficiently communicate over the network. Modem 560 may perform signal conditioning (e.g., filtering), signal encoding and decoding, signal modulation and demodulation, and/or error correction for data being transferred over the access stratum. Modem 560 may also operate in the non-access stratum and thus facilitate signaling and coordination with network devices in wireless access network to manage the establishment of communication sessions and for maintaining continuous communications.

Positioning system 570 may include a variety of receivers, sensors, and/or processors to provide relative and/or absolute position and orientation data of UE 110. For example, positioning system 570 may include a satellite navigation system, such as, for example, global positioning system (GPS) component, which may provide position information in relation to a standard reference frame. Position information may include rectangular coordinates in the world geodetic system 1984 (WGS84) frame (in either two or three dimensions), geodic coordinates such as latitude, longitude, and altitude, and/or other suitable positioning data. In another embodiment, positioning system 570 may include an internal measurement unit (IMU) to determine relative displacements based on measured accelerations, and/or gyroscopes to measure angular displacements such as the roll, pitch, and yaw of the UE 110. Positioning system 570 may further include sensors, such as magnetometers, which may be used to determine orientation in a reference frame, such as, for example, the angular orientations with respect to magnetic and/or true north.

Antenna controller 580 may accept data for transmission from processor 520 and/or modem 560, and perform TX MIMO encoding if required to produce multiple channels of data for a set of the antenna elements in antenna array 590, which may be transmitted over an uplink via wireless channel over RAT 215, 217. Signals which have been received in a downlink, via a wireless channel over RAT 215, 217, through antenna array 590 may be decoded using RX MIMO decoding to combine streams into fewer data channels or a single received channel. Antenna controller 580 may further apply beamforming weights (which perform relative phase, frequency, and amplitude modulations between the antenna elements) on the transmit data streams to electronically adjust the transmit antenna pattern. Additionally, antenna controller 580 may apply beamforming weights on the receive data streams to electronically adjust the receive antenna pattern. Such adjustments may include main lobe pointing (the antenna pattern's main lobe may also be referred to herein as the "antenna beam," the "beam," or the "main beam"). Other adjustments may include "forming nulls" which may include pointing side lobe nulls in a particular direction and/or changing the side lobe pattern to alter the placement and/or depth of antenna pattern nulls. Moreover, when transmitting or receiving in enhanced coverage mode, antenna controller 580 may perform additional processing to improve the reliability and or signal-to-noise ratio of the wireless channel when UE 110 operates in an environment which presents challenging signal conditions that would significantly degrade wireless channel operating in normal coverage mode.

RF TX/RX elements 585 may include discreet RF elements to amplify, frequency demodulate (e.g., down convert) analog channels received over antenna array 590 and convert the analog channels to received digital streams using analog to digital converters. The received digital streams may be passed to antenna controller 580 which may further perform RX MIMO processing to combine MIMO streams. RF TX/RX elements 585 may further process transmit digital streams, which may be TX MIMO encoded by antenna controller 580 prior to being converted to analog signals using digital to analog converters. The analog signals may be frequency upconverted and amplified for transmission by RF TX/RX elements 585, and subsequently radiated by antenna array 590.

Antenna array 590 may include at least two antenna elements which have independent channels that may be used for electronic adjustments of both the transmit and receive antenna patterns, and/or also for transmit and/or receive MIMO processing to improve wireless channel reliability and/or throughput.

I/O devices 595 may include one or more mechanisms that permit an operator to input information to UE 110, such as, for example, a keypad or a keyboard, a microphone, voice recognition and/or biometric mechanisms, etc. I/O devices 595 may also include one or more mechanisms that output information to the operator, including a display, a speaker, etc.

UE 110 may perform certain operations or processes, as may be described in detail below. UE 110 may perform these operations in response to processor 520 executing software instructions contained in a computer-readable medium, such as memory 530. A computer-readable medium may be defined as a physical or logical memory device. A logical memory device may include memory space within a single physical memory device or spread across multiple physical memory devices. The software instructions may be read into memory 530 from another computer-readable medium, such as storage device 540, or from another device via the network. The software instructions contained in memory 540 may cause processor 520 to perform operations or processes. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE 110 illustrated in FIG. 5 is for illustrative purposes only. It should be understood that other configurations may be implemented. Therefore, UE 110 may include additional, fewer and/or different components than those depicted in FIG. 5.

Figure 6A:
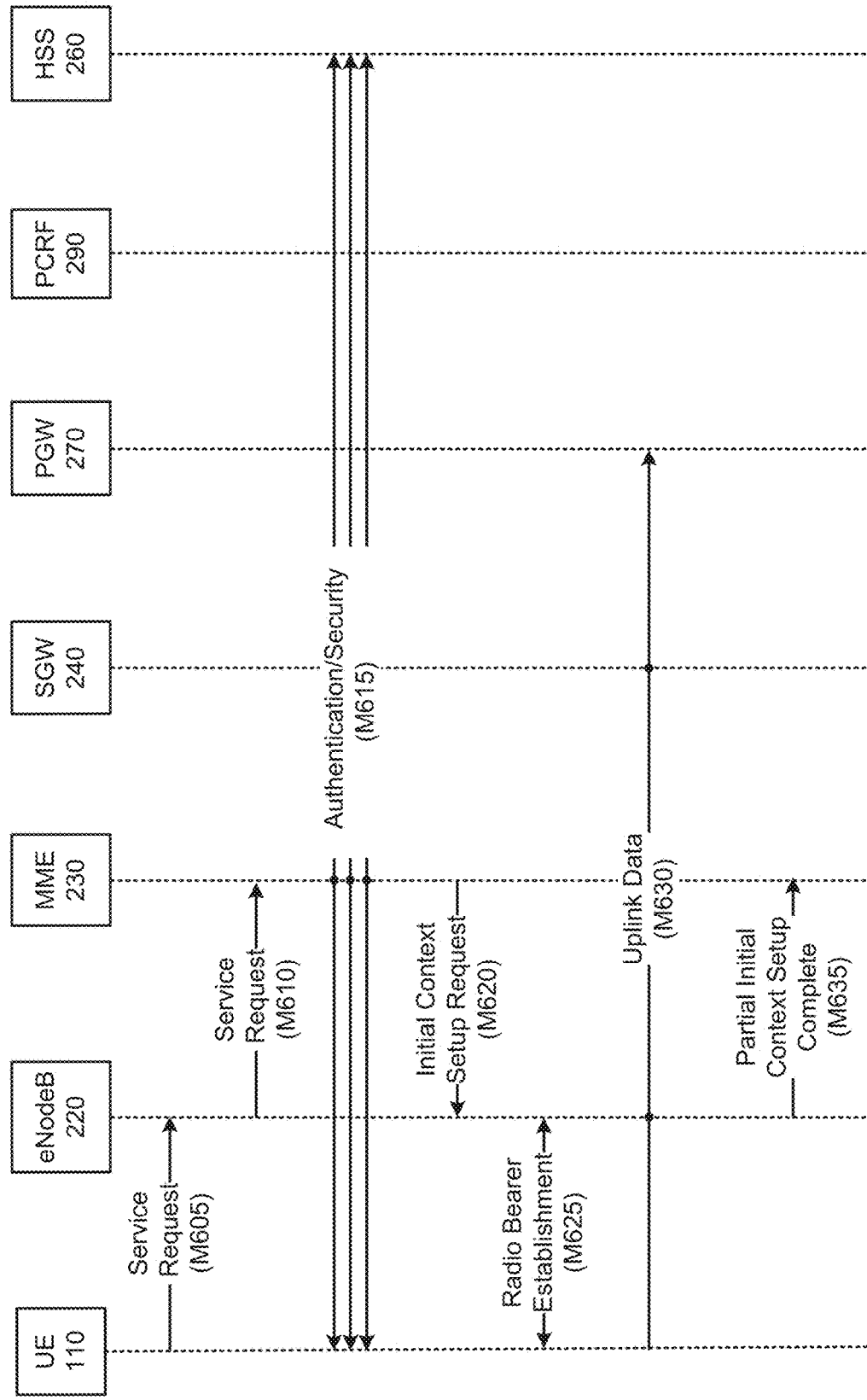
FIGS. 6A and 6B are call flow diagrams showing message flows associated with establishing radio bearers for wireless communication using an LTE RAT.
Figure 6B:
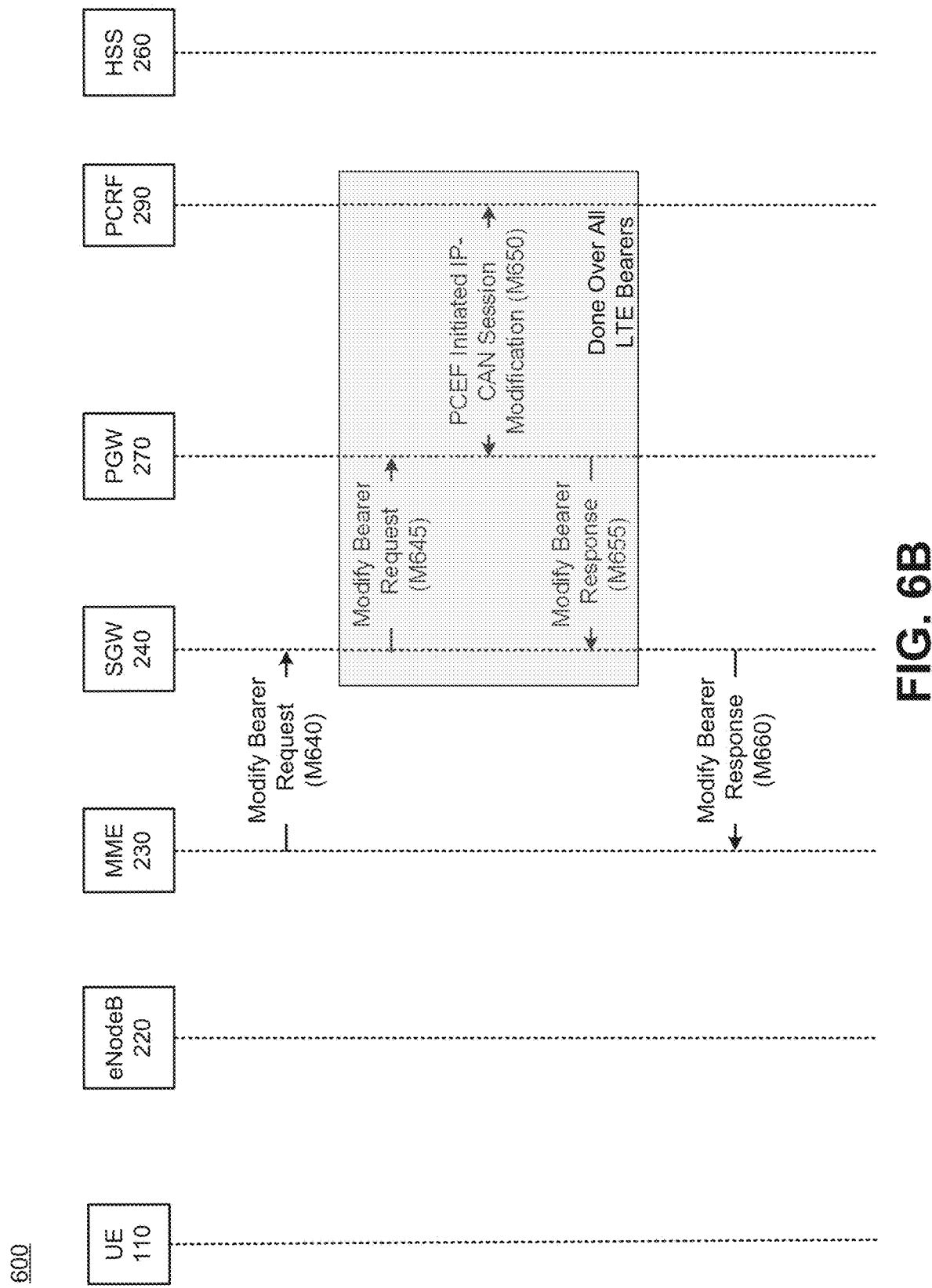

FIGS. 6A and 6B are diagrams showing exemplary message flows within networking system 200 for establishing a first set of radio bearers in the case of a service request. The first set of radio bearers may be associated with primary RAT 215 based on LTE standards. Referring to FIG. 6A, UE 110 may initially send a service request to eNodeB 220 (M605). The service request may be made subsequent to UE 110 transitioning from a power saving idle state to an active state. In this case, all of the radio bearers that were previously setup prior to UE 110 going into an idle state are reestablished. EnodeB 220 may provide a service request to MME 230 to reestablish bearers between the eNodeB 220 and SGW 240 over the S1-U interface 225 (M610). UE 110, MME 230, and HSS 260 may exchange multiple authentication and security messages determining the permissions and service levels (QoS, bandwidths, etc.) authorized or set by the service provider for the user associated with UE 110 (M615). Once UE 110 is authenticated for service, MME 230 may send an initial context setup request to eNodeB 220 (M620). The context may include signaling bearers (e.g. Radio Resource Control bearer and a Non-Access Stratum bearer) and a data radio bearer. ENodeB 220 and UE 110 may exchange messages to establish the first set of radio bearers associated with RAT 215 based on LTE (M625). Information messages M625 may include an indication that additional bearers may be set up on RAT 217. This indication may be sent so that the UE 110 will not drop any bearers that were previously setup, but were not included in the first set of radio bearers.

Once the radio bearers have been established, UE 110 may send uplink data to PGW 270 via eNodeB 220 and SGW 240 (M630). ENodeB 220 may send a message to MME 230 indicating that the context setup for the first set of bearers is complete (M635). This message may include a flag indicating the setup is only partially complete, as the second set of bearers associated with RAT 217 on 5G have not been setup.

Referring to FIG. 6B, MME 230 may send a modify bearer request to SGW 240 for each radio bearer that has been established. (M640). As shown in FIG. 6B, a shaded box is shown to indicate messages M645-M655 are exchanged for each bearer associated with the first set of bearers to perform the modification operation. The modification includes updating the address of eNodeB 220 in each bearer so SGW 240 may send data to eNodeB 220 on the download channel associated with RAT 215. A modify bearer request is sent to PGW 270 (M645) for each bearer. Messages are then exchanged between PGW 270 and PCRF 290 to modify the internet protocol connectivity access network (IP-CAN) session (M650) for each bearer. PGW 270 may send a modify bearer response to SGW 240 indicating that each bearer has been modified (M655). Once all of the bearers have been modified, SGW 240 will send a modify bear response to MME 230 (M660).

Figure 7A:
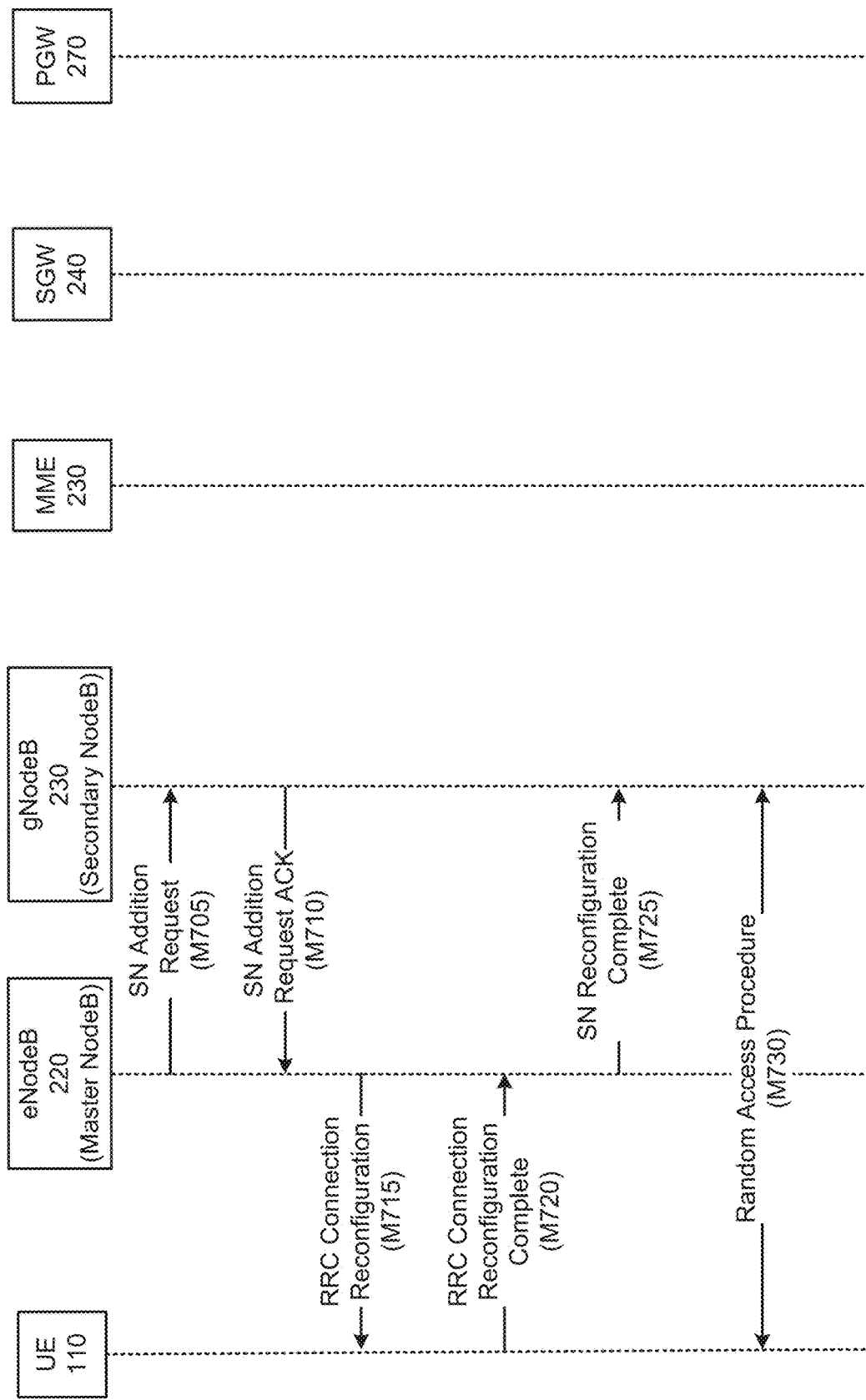
FIGS. 7A and 7B are call flow diagrams showing message flows establishing radio bearers for wireless communication using a 5G RAT.
Figure 7B:
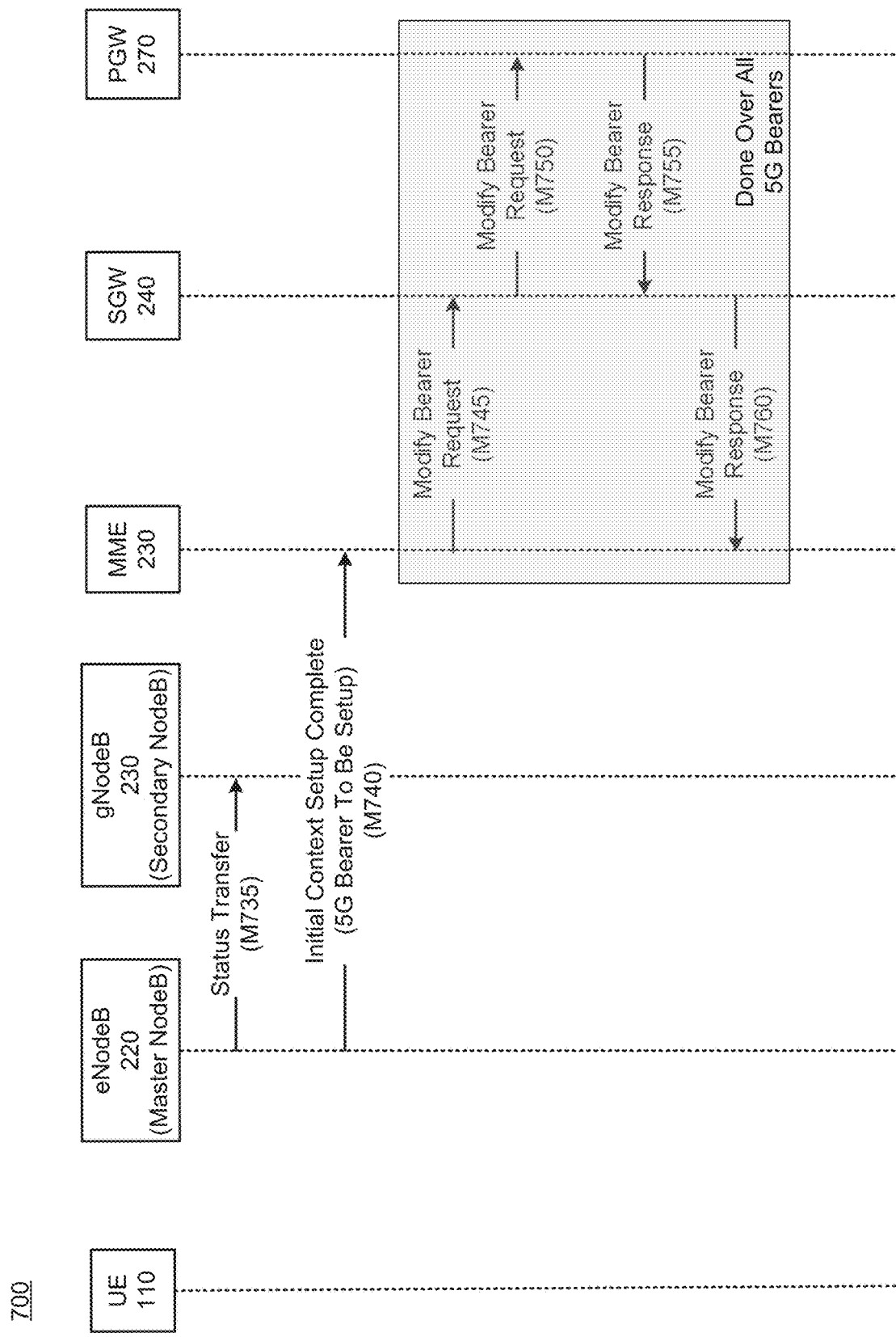

FIGS. 7A and 7B are diagrams showing exemplary message flows within networking system 200 for establishing a second set of radio bearers for the case of a service request. Once the first set of radio bearers associated with RAT 215 have been setup, the second set of radio bearers associated with secondary RAT 217 may be setup based on 5G standards. Referring to FIG. 7A, eNodeB 220, which is serving as a master NodeB (MN), may send a secondary node (SN) addition request to gNode B 230 (M705), and gNodeB 230 may respond with an acknowledgment that it is available to serve as a SN (M710). EnodeB 220 may send a radio resource control (RRC) connection reconfiguration message to UE 110 so it may establish a second set of radio bearers with gNodeB 230 (M715). Upon reconfiguration of the RRC connection for the UE 110, UE 110 may send an RRC connection reconfiguration complete message (M720), and eNodeB 220 may provide an SN reconfiguration complete message to gNodeB 230 (M725) initiating a second set of radio bearers to be established. UE 110 and gNodeB 230 may exchange data over a random access procedure (M730).

Referring to FIG. 7B, eNodeB 220 may send a status transfer message to gNodeB 230 (M735), and then send an intial context setup complete message to MME 230 (M740), to indicate to ePC 240 that 5G bearers are to be modified in ePC 240. As shown in FIG. 7B, a shaded box is shown to indicate messages M745-M760 are exchanged for each bearer associated with the second set of bearers to perform the modification operation. The modification includes updating the address of gNodeB 230 in each bearer so SGW 240 may send data to gNodeB 230 on the download channel associated with RAT 217. A modify bearer request is sent to from MME 230 to SGW 240 (M745) for each bearer. The modification bearer request is forwarded from SGW 240 to PGW 270 (M750). PGW 270 may send a modify bearer response to SGW 240 indicating that each bearer has been modified (M755), and then SGW 240 may send a modify bearer response to MME 230 (M760). In this manner, the second set of radio bearers associated with RAT 217 may be directly established in the secondary access network without having to waste resources by initially setting the second set of radio bearers up by eNodeB 220 for RAT 215, and subsequently transferring the second set of radio bearers to gNodeB 230 for use with RAT 217.

FIG. 8 is a flow chart showing an exemplary process 800 for bearer activation which may be performed by master node 120. In an embodiment, process 800 may be performed by processor 310 within eNodeB 220 executing instructions stored in memory 320, and/or mass storage device 330.

Referring to FIG. 8, master node 120 may receive information regarding channel conditions associated with the secondary RAT 117 at master node 120 (Block 805). MN 120 may be associated with primary RAT 115. In an embodiment, master node 120 may receive measurement reports from UE 110 regarding channel conditions of secondary RAT 117 between the UE 110 and the secondary node 130. Master node 120 may identify a first set of radio bearers suitable for primary RAT 115 and a second set of radio bearers suitable for secondary RAT 117 based on the received channel conditions (Block 810). In an embodiment, master node 120 may receive a list of bearers to be activated for exchanging service data flows associated with a plurality applications. In an embodiment, master node 120 may compare the received list of bearers with information residing within master node 120 that identifies the suitability of bearers associated with different RATs 115, 117 for the service data flows associated with the plurality applications. Master node 120 may establish only the first set of radio bearers associated with primary RAT 117 (Block 815).

Master node 120 may provide a message to core network 140 indicating that the first set of radio bearers have been established for primary RAT 115 (Block 820). The message may include an indication that the second set of radio bearers will subsequently be established after core network 140 has been configured for operation with the first set of radio bearers. In an embodiment, master node 120 may provide UE 110, upon establishing the first set of radio bearers and prior to establishing the second set of radio bearers, an indication that additional bearers associated with secondary RAT 117 will subsequently be established at a later time. In an embodiment, master node 120 may send a message to core network 140 that a completion of a context setup for the first set of radio bearers is partially complete to indicate that a context for the second set of radio bearers has not been setup, as described above with respect to FIG. 6A (e.g., M635).

Master node 120 may then reconfigure UE 110 for establishing the second set of radio bearers associated with secondary RAT 117 (Block 825), as described above with respect to FIGS. 7A and 7B. Master node 120 may indicate to secondary node 130 that the reconfiguration of UE 110 for the second set of radio bearers is complete (Block 830).

In an embodiment, master node 120 is an eNodeB 220 wirelessly communicating with primary RAT 215 associated with an LTE network. Secondary node 130 is gNodeB 230 wirelessly communicating with secondary RAT 217 associated with a 5G network.

The foregoing description of implementations provides illustration and description, but is not intended to be exhaustive or to limit the invention to the precise form disclosed. Various preferred embodiments have been described with reference to the accompanying drawings. It will be evident that modifications and changes may be made thereto, and additional embodiments may be implemented, without departing from the broader scope of the invention as set forth in the claims that follow. For example, while series of messages, states, and/or blocks have been described with regard to FIGS. 6A-8, the order of the messages, states, and/or blocks may be modified in other embodiments. Further, non-dependent messaging and/or processing blocks may be performed in parallel. The specification and drawings are accordingly to be regarded in an illustrative rather than restrictive sense.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, at a master node associated with a primary radio access technology (RAT), information regarding channel conditions associated with a secondary RAT;
   identifying, by the master node, a first set of radio bearers suitable for the primary RAT and a second set of radio bearers suitable for the secondary RAT based on the received channel conditions;
   establishing, by the master node, only the first set of radio bearers associated with the primary RAT;
   providing, from the master node, a message to a core network indicating that the first set of radio bearers have been established for the primary RAT, wherein the message includes an indication that the second set of radio bearers will subsequently be established after the core network has been configured for operation with the first set of radio bearers;
   reconfiguring, by the master node, a user equipment (UE) for establishing the second set of radio bearers associated with the secondary RAT; and
   indicating, by the master node to a secondary node, that the reconfiguration of the UE for the second set of radio bearers is complete.

2. The method of claim 1, wherein the receiving further comprises:
   receiving measurement reports from the UE regarding channel conditions of the secondary RAT between the UE and the secondary node.

3. The method of claim 1, wherein the identifying comprises:
   receiving a list of bearers to be activated for exchanging service data flows associated with a plurality of applications.

4. The method of claim 3, wherein the identifying further comprises:
   comparing the received list of bearers with information residing within the master node identifying the suitability of bearers associated with the different RATs for the service data flows associated with the plurality of applications.

5. The method of claim 1, further comprising:
   providing, from the master node to the UE upon establishing the first set of radio bearers and prior to establishing the second set of radio bearers, an indication that additional bearers associated with the secondary RAT will be established.

6. The method of claim 1, wherein the providing further comprises:
   sending a message to the core network that a completion of a context setup for the first set of radio bearers is partially complete to indicate that a context for the second set of radio bearers has not been setup.

7. The method of claim 1, wherein the master node is an eNodeB wirelessly communicating via the primary RAT associated with an LTE network, and the secondary node is a gNodeB wirelessly communicating via the secondary RAT associated with a 5G network.

8. A node, comprising:
   a network interface;
   an RF interface and antenna associated with a primary radio access technology (RAT);
   a memory configured to store instructions; and
   a processor coupled to the communication interface and the memory, wherein the processor is configured to execute the instructions stored in the memory to:
   receive information regarding channel conditions associated with a secondary RAT;
   identify a first set of radio bearers suitable for the primary RAT and a second set of radio bearers suitable for the secondary RAT based on the received channel conditions;
   establish only the first set of radio bearers associated with the primary RAT;
   provide a message to a core network indicating that the first set of radio bearers have been established for the primary RAT, wherein the message includes an indication that the second set of radio bearers will subsequently be established after the core network has been configured for operation with the first set of radio bearers;
   reconfigure a user equipment (UE) for establishing the second set of radio bearers associated with the secondary RAT; and indicate to a secondary node, that the reconfiguration of the UE for the second set of radio bearers is complete.

9. The node of claim 8, wherein the instructions for receiving cause the processor to:
receive measurement reports from the UE regarding channel conditions of the secondary RAT between the UE and the secondary node.

10. The node of claim 8, wherein the instructions for identifying cause the processor to:
receive a list of bearers to be activated for exchanging service data flows associated with a plurality of applications.

11. The node of claim 10, wherein the instructions for identifying cause the processor to:
compare the received list of bearers with information residing within the master node identifying the suitability of bearers associated with the different RATs for the service data flows associated with the plurality of applications.

12. The node of claim 8, wherein the instructions cause the processor to:
provide to the UE upon establishing the first set of radio bearers and prior to establishing the second set of radio bearers, an indication that additional bearers associated with the secondary RAT will be established.

13. The node of claim 8, wherein the instructions for providing cause the processor to:
send a message to the core network that a completion of a context setup for the first set of radio bearers is partially complete to indicate that a context for the second set of radio bearers has not been setup.

14. The node of claim 8, wherein the node is an master node eNodeB wirelessly communicating via the primary RAT associated with an LTE network, and the secondary node is a gNodeB wirelessly communicating via the secondary RAT associated with a 5G network.

15. A non-transitory computer-readable medium comprising instructions, which, when executed by a processor, cause the processor to:
receive, at a master node associated with a primary radio access technology (RAT), information regarding channel conditions associated with a secondary RAT;
identify, by the master node, a first set of radio bearers suitable for the primary RAT and a second set of radio bearers suitable for the secondary RAT based on the received channel conditions;
establish, by the master node, only the first set of radio bearers associated with the primary RAT;
provide, from the master node, a message to a core network indicating that the first set of radio bearers have been established for the primary RAT, wherein the message includes an indication that the second set of radio bearers will subsequently be established after the core network has been configured for operation with the first set of radio bearers;
reconfigure, by the master node, a user equipment (UE) for establishing the second set of radio bearers associated with the secondary RAT; and
indicate, by the master node to a secondary node, that the reconfiguration of the UE for the second set of radio bearers is complete.

16. The non-transitory computer-readable medium of claim 15, wherein the instructions for receiving cause the processor to:
receive measurement reports from the UE regarding channel conditions of the secondary RAT between the UE and the secondary node.

17. The non-transitory computer-readable medium of claim 15, wherein the instructions for identifying cause the processor to:
receive a list of bearers to be activated for exchanging service data flows associated with a plurality of applications.

18. The non-transitory computer-readable medium of claim 17, wherein the instructions for identifying cause the processor to:
compare the received list of bearers with information residing within the master node identifying the suitability of bearers associated with the different RATs for the service data flows associated with the plurality of applications.

19. The non-transitory computer-readable medium of claim 15, wherein the instructions further cause the processor to:
provide, from the master node to the UE upon establishing the first set of radio bearers and prior to establishing the second set of radio bearers, an indication that additional bearers associated with the secondary RAT will be established.

20. The non-transitory computer-readable medium of claim 15, wherein the instructions for providing cause the processor to:
send a message to the core network that a completion of a context setup for the first set of radio bearers is partially complete to indicate that a context for the second set of radio bearers has not been setup.

* * * * *